United States Patent [19]

Drake et al.

[11] Patent Number: 5,521,248
[45] Date of Patent: May 28, 1996

[54] FLOWABLE ADHESIVE ELASTOMERIC COMPOSITIONS

[75] Inventors: Ronald E. Drake; John M. Labriola, both of Grand Junction, Colo.

[73] Assignee: Ricon Resins, Inc., Grand Junction, Colo.

[21] Appl. No.: 409,469

[22] Filed: Mar. 23, 1995

Related U.S. Application Data

[63] Continuation-in-part of Ser. No. 977,436, Apr. 13, 1993, abandoned, which is a continuation-in-part of Ser. No. 575,990, Aug. 31, 1990, abandoned, which is a continuation-in-part of Ser. No. 571,459, Aug. 21, 1990, abandoned.

[51] Int. Cl.$^6$ ..................................................... C08L 27/04
[52] U.S. Cl. ........................... 525/75; 525/78; 525/221; 525/267; 525/285; 427/388.1; 427/393.5; 427/395
[58] Field of Search .................... 525/75, 78, 267, 525/221, 285; 427/388.1, 393.5, 395

[56] References Cited

U.S. PATENT DOCUMENTS

| | | |
|---|---|---|
| 4,218,349 | 8/1990 | Minatono . |
| 4,908,396 | 3/1990 | Evans et al. . |
| 5,300,569 | 2/1993 | Drake et al. ........................ 525/78 |

FOREIGN PATENT DOCUMENTS

| | | |
|---|---|---|
| 0231731 | 8/1987 | European Pat. Off. . |
| 1576333 | 7/1969 | France . |
| 2539412 | 3/1976 | Germany . |

OTHER PUBLICATIONS

Schidrowitz, P. and Redfarm, C.A. (1935) J. Soc. Chem. Ind. 54:263T.
Nelson, E. R. et al. (1958) Ind. Eng. Chem. 50:329–330.
Von Ooij, W. J. (1979) Rubber Chem. Tech. 52:605–675.
Von Ooij, W. J. (1984) Rubber Chem. Tehcnol. 57:421–456.
Bacon, R. G. R. and Farmer, E. H. (1939) Rubber Chem. Technol. 12:200–209.
Kambara, S. et al. (1944) Soc. Chim. Ind. Japan 45:141–143; CA 43, 1595 (1949).
Drake (1982) Elastomerics 114:28–34.
World Patents Index, Derwent Publ. Ltd., London, BG; AN 75–49890W[30] & JP–A–49 108 141 (Japan Geon KK) 15 Oct. 1974 (abstract).
World Patents Index, Derwent Publ. Ltd., London, GB; AN 76–97167X[52] & JP–A–51 130 435 (Nippon Zeon KK) 13 Nov. 1987 (abstract).
Colorado Chemical Specialties, Inc. Bulletin CCS–107, "High Vinyl 1–2 Liquid Polybutadiene Ricon EPDM/EPM Coagents".
Advanced Resins, Inc. Bulletin (Jun. 6, 1991).

*Primary Examiner*—Melvyn I. Marquis
*Attorney, Agent, or Firm*—Greenlee, Winner and Sullivan

[57] ABSTRACT

A flowable uncured adhesive elastomeric composition suitable for delivery to assembly sites by pumping through supply lines is provided, which has a tensile strength suitable for formation of a strong bond, comprising: (a) an elastomer having a viscosity higher than flowable; (b) a synthetic resin curable by the same cure system as said non-flowable elastomer in an amount sufficient to lower the viscosity of the mixture to a pumpable level; (c) an unsaturated polymeric adduct of a dicarboxylic acid or dicarboxylic acid derivative in an amount sufficient to provide adhesive properties to the mixture; and (d) a curing agent. Preferably the composition also comprises a crosslink-enhancing coagent in an amount sufficient to lower percent elongation and increase adhesive bond strength of the cured elastomer. The compositions are useful for bonding substrates such as other elastomers, metals, plastics, glass, fibers, paper and fabrics.

39 Claims, No Drawings

FLOWABLE ADHESIVE ELASTOMERIC COMPOSITIONS

CROSS-REFERENCE TO RELATED APPLICATIONS

This application is a continuation-in-part of U.S. Ser. No. 07/977,436 filed Apr. 13, 1993, now abandoned, which is a continuation-in-part of U.S. Ser. No. 07/575,990 filed Aug. 31, 1990, now abandoned, which is a continuation-in-part of U.S. Ser. No. 07/571,459 filed Aug. 21, 1990, now abandoned, all incorporated by reference herein.

FIELD OF THE INVENTION

This invention is an improved adhesive elastomeric composition for bonding substrates together, having improved properties of flowability.

BACKGROUND OF THE INVENTION

Uncured adhesive elastomeric compositions suitable for bonding diverse substrates such as other elastomers, metals, plastics, glass, fibers, paper and fabrics, have been disclosed by the inventors hereof in application Ser. Nos. 07/575,990, filed Aug. 31, 1990 and 07/571,459, filed Aug. 21, 1990, both abandoned. It is often desirable to apply such compositions to the substrates in a flowable form. For example, in industrial operations such as automobile manufacturing, shoe manufacturing or rotomolding of rubber parts it is desirable to use such compositions to replace welding in an assembly-line-type process. Compositions having reduced viscosity so as to be pumpable through supply lines are desirably used.

As is taught in the above U.S. patent applications, adhesive rubber compositions can be prepared by the addition of certain polymeric adducts to elastomeric compositions. This invention involves the addition of low molecular weight elastomers to such elastomeric/polymeric compositions to produce flowable compositions.

The flowability of an adhesive elastomeric composition can be increased by using elastomers of low molecular weight and viscosity in the formulation, so as to increase the flowability of the mixture, however, in general, the flowability of such compositions cannot be increased without sacrificing tensile and bond strength.

Bond strength, as measured by lap shear tests, is a direct indication of adhesive strength. Theoretically bond strength cannot be greater than two times tensile strength. The present compositions achieve adhesiveness of up to about 1.4 times tensile strength. However, as the present invention shows, adhesiveness is not directly proportional to tensile strength.

As is known to the art, the degree of crosslinking is also not a direct measure of the tensile strength or bond strength of a composition. Too high a degree of crosslinking can make a composition brittle and promote cracks.

While greater crosslinking may improve tensile strength up to an optimum point which varies from elastomer to elastomer, most elastomers are cured beyond this optimum point, and thus crosslink enhancing coagents would not enhance tensile strength, but rather would lower tensile strength. Such coagents are usually used to improve compression set, improve modulus and decrease elongation, or to enable the use of fillers in the composition. When elastomers having an average molecular weight low enough to flow freely at reasonably low temperatures (e.g., less than about 100°), are used to formulate the adhesive compositions, the cured product is less tough than would be desirable, i.e., elongation is greater than desirable at a given tensile or bond strength.

When nonliquid elastomers are cured in the presence of crosslink-enhancing agents, percent elongation decreases and modulus at 100° increases. For example, Colorado Chemical Specialties, Inc. Bulletin CCS-107, "High Vinyl 1-2 Liquid Polybutadiene Ricon EPDM/EPM Coagents" discloses that when a preferred crosslink enhancing agent of this invention, Ricon 153™ of Advanced Resins, Inc. (formerly Colorado Chemical Specialties, Inc., Grand Junction, Colo.) is added at 10 phr (parts per hundred) to EPDM rubber formulations, percent elongation decreases from 440 to 250 and 100% modulus increases from 210 to 380. However, elongation percent for cured flowable adhesive rubber compositions should be less than about 200%, and preferably less than about 180%.

It was surprising to find that flowable compositions could be made with acceptable tensile strengths and that the adhesiveness of such compositions could be improved by the addition of crosslink-enhancing coagents, while maintaining good tensile strength and improving elongation properties (toughness).

Crosslink-enhancing coagents known to the art include liquid polybutadienes having the properties of high 1,2 vinyl content such as Ricon 153™ and Ricon 154™, polybutadiene products of Advanced Resins, Inc., Grand Junction, Colo., di, tri and tetra functional acrylates and methacrylates, triallylcyanurate (TAC), triallylisocyanurate (TAIC), triallyltrimellitate (TATM), and N,N-metaphenylenedimaleimide (HVA-2). These coagents have been used as crosslink-enhancing coagents primarily with peroxide-cured elastomers. HVA-2 and the Advanced Resin products have also been used with sulfur-cured elastomers. These agents have been used to make the elastomers harder and more resistant to swell. However, such coagents have not been known to increase the adhesiveness of an elastomer.

SUMMARY OF THE INVENTION

An uncured adhesive elastomeric composition is provided having a Mooney viscosity at most about 20 at a temperature of 125° C., comprising:

(a) An elastomer having a raw Mooney viscosity ML 1+4 at 125° C. between about 20 and about 85, and preferably between about 40 and about 70, and having the ability to be cured by peroxide, sulfur or resin systems. Preferably this elastomer is used in an amount between about 30 and about 70 phr, and more preferably in an amount between about 40 and about 60 phr. The upper limit of concentration used may vary depending on the particular compounds chosen as components of the elastomeric composition of this invention, and should not be so high as to render the final mixture too viscous to be pumpable. A preferred elastomer is EPDM 70A, a fast-curing ethylene propylene diene rubber of DSM Copolymer Inc. of Baton Rouge, La.

(b) A synthetic resin curable by the same cure system as component (a) above, having an average molecular weight between about 5,200 and about 70,000 as determined by viscosity analysis. Molecular weights determined by viscosity analysis, which is a measure of average molecular weight, are termed herein "viscosity average molecular weights." This resin is preferably Trilene, a class of Trilene™ Liquid Polymers which are polymers of ethylene, propylene and a diene termonomer, wherein the diene termonomer is either dicyclopentadiene (DCPD) or 5-ethylidene 2-norbornene (ENB), having an average molecular weight of between about 5,200 and about 8,000, as determined by viscosity analysis. The terpolymer is preferably Trilene 65, a product of Uniroyal Chemical Company, Middlebury, Conn. A sufficient amount of this resin should be used to lower the Mooney viscosity of the mixture to at most about 20 and preferably at most about 5 at a temperature of about 125° C. Too high a proportion of this elastomer will lower tensile and bond strengths to unacceptable levels. Preferably this elastomer is used in an amount between about 30 and about 70 phr, and more preferably in an amount between about 40 and about 60 phr. Preferably this resin has an analogous structure to the elastomer of component (a), e.g., a polymer having identical or similar units but with a shorter chain length.

(c) An unsaturated polymeric adduct of a dicarboxylic acid or dicarboxylic acid derivative wherein the acid or derivative moiety comprises at least about three weight percent of said adduct. Preferably the polymer is a polybutadiene such as a random polybutadiene polymer containing both 1,4 and 1,2 butadiene units. The ratio of 1,2 vinyl and 1,4 cis and trans double bonds in the polymer can be from about 15 to about 90% 1,2 vinyl, and preferably from about 20 to about 70% 1,2 vinyl. Unless specified otherwise, as used herein all percents are weight percents. A polymer in which most of the double bonds in the butadiene units are 1,2 double bonds and which can be used in the present invention can be prepared by polymerizing butadiene alone or with other monomers in the presence of a catalyst comprising a compound of a metal of group VIII of the periodic table and alkyl aluminum. This adduct should be used in an amount sufficient to provide adhesive properties to the mixture, but not so high as to degrade physical properties such as speed of curing, tensile strength, and the like. Preferably the adduct is used in an amount between about 5 and about 40 phr, and more preferably in an amount between about 10 and about 20 phr. As will be understood by those skilled in the art, the components of the elastomeric compositions of this invention are expressed in parts per hundred (phr) whereby the total phr of component (a) plus component (b) equals 100. Additional components are expressed in phr based on their proportion to the sum of components (a) plus (b), so that the total phr for all components in the composition will be greater than 100. Preferred adducts are the maleic adduct resins sold by Advanced Resins, Inc. of Grand Junction, Colo. under the trademark RICOBOND, as described in Advanced Resins, Inc. Bulletin dated Jun. 6, 1991 based on a paper presented at the 138th Meeting of the Rubber Division, American Chemical Society, Washington, D.C. Oct. 9–12, 1990.

(d) A curing agent such as peroxide, sulfur and sulfur donors and accelerators, or resin cure systems, such as bromophenol or SP1055 of Schenectady Chemical Company. Preferably peroxide curing agents are used, and more preferably, dicumyl peroxide. The amount of curing agent used, as is known to those skilled in the art, should be sufficient to bring about cure in a reasonable period of time without excessive scorch or detracting from the adhesive properties of the composition.

Compositions according to the foregoing, surprisingly, exhibit tensile strengths in the desired range, i.e., greater than about 8 MPa, preferably greater than about 10 MPa, and more preferably greater than about 12 MPa.

It is often desirable to produce an adhesive rubber elastomer having a lower percent elongation, and a higher 100% modulus than the compositions described above. In a further embodiment of this invention, it has been discovered that the addition of crosslink-enhancing coagents will bring about the desired properties to a much greater degree than predicted from a knowledge of the behavior of these coagents in non-flowable elastomeric systems. Moreover, the adhesiveness of the elastomer is significantly increased by the addition of these coagents. Therefore the compositions of this invention advantageously also include:

(e) a crosslink-enhancing coagent having a viscosity from about 300 to about 5000 poise at a temperature of 45° C., and more preferably about 2,500 poise at 45° C. Preferred resins are those having at least fifty percent 1,2 vinyl content, such as the 1,2 polybutadiene resins, e.g. the Ricon 153™ compound described in Colorado Chemical Specialties, Inc. Bulletin CCS 1–7, supra, and the closely related product Ricon 154™ also described in said CCS Bulletin. Other useful coagents are di, tri and tetra functional acrylates and methacrylates, triallylcyanurate (TAC), triallylisocyanurate (TAIC), triallyltrimellitate (TATM) and N,N-metaphenylenediamaleimide (HVA-2). The coagent should be used in amounts sufficient to bring about enough crosslink density to provide tensile strength of the cured product within acceptable limits while lowering percent elongation and increasing adhesiveness and modulus. Preferably ultimate elongation percent of the cured composition should be less than about 200 and more preferably less than about 180, and modulus at 100% should be at least about 1.0 MPa and more preferably, at least about 3.0 MPa.

Equivalent compositions can be made using elastomers having a molecular weight equivalent to the resultant average molecular weight of components (a) and (b), e.g., between about 40,000 and about 800,000, having a viscosity low enough to be pumpable in combination with components (c) and (d), and optionally (e).

Monomeric linear and cyclic anhydrides are not useful for the purposes of this invention because these generally low molecular weight materials have high vapor pressures and for this reason are toxic and difficult to work with during compounding and vulcanization processes normally encountered in the use of elastomers. Polymeric linear anhydrides may be produced from dicarboxylic acids by heating the acids in the presence of catalysts such as barium and thorium hydroxides, but these materials are not adequate materials for the enhancement of adhesion as taught by this invention due to low solubility in rubber compounds in general, and more importantly, due to chemical decomposition into water vapor, carbon dioxide and cyclic ketones during compounding and vulcanization steps. The unsaturated polymeric compositions useful in this invention for adducting with dicarboxylic acid or derivatives are viscous liquids having a molecular weight between about 400 molecular weight units and about 1,000,000 molecular weight units. Polymeric compositions having a molecular weight between about 1,600 and about 30,000 molecular weight units are preferred. When the polymer, e.g., polyisoprene, has a cis-1,4 content of about 70% or less, it is preferred that the molecular weight be less than about 8,000.

As will be appreciated by those skilled in the art, the processability of the uncured composition can be adjusted by adjusting the molecular weight of the polymeric composition, and, e.g., in the case of polyisoprenes, the cis-1,4 content. The amount of dicarboxylic acid or derivative affects the viscosity. As the amount of dicarboxylic acid or derivative is increased, the adhesive properties of the composition are increased, along with the viscosity of the uncured composition. The processability of the composition may then be adjusted by altering molecular weight of the polymer.

When the elastomer used is or comprises natural rubber, e.g., up to about 65% natural rubber, and the polymer is polyisoprene or a similar polymer having a cis-1,4 content less than about 70%, the polymer should have a molecular weight less than about 8,000.

Applicants have found that synthetic rubbers may also be used and synthetic elastomers are in many ways preferable to make the adhesive elastomeric compositions of this invention, and amount of adduct used, molecular weight and cis-1,4 content of the polymer used, and other additives may be adjusted in accordance with the teachings of this invention to achieve desired adhesive properties without loss of tensile strength and other physical properties. Principles known in the art such as plasticizers and process aids may also be used to adjust viscosity and processability of the compositions.

A method of making flowable adhesive elastomeric compositions is also taught comprising the following steps: adding to a composition comprising an elastomer as described in paragraph (a) above and a curing agent as described in paragraph (d) above, a lower molecular weight resin as described in paragraph (b) above; and then mixing in an adducted resin as described in paragraph (c) above in an amount sufficient to provide adhesive properties to the mixture. As will be appreciated by those skilled in the art, additional components such as carbon black and fillers, as well as antioxidants, and tackifiers may be added to the mixture. It is preferred that the adduct (c) be added last, and it may be added simultaneously with the low molecular weight resin (b). In a further embodiment, the method comprises the addition of a crosslink-enhancing coagent as described in paragraph (e) above. The coagent may be added with the resin (b) and adduct (c), or prior to addition of the adduct (c).

It is preferred that fillers, preferably carbon black be used in the mixtures. As is known to the art, such fillers are capable of increasing the tensile strength of the product. These materials should be mixed by shearing to break up the molecular structure and this requires that the mixture be more viscous than the pumpable formulation finally resulting from the process of making the compositions of this invention. Therefore, the fillers should be mixed into the composition prior to adding the resin components (b), (c) and (e).

As is understood in the art, for best results the components should be homogeneously mixed.

The compositions of this invention are used in a method for adhesively bonding together substrates such as other elastomers, metals, plastics, glass, fibers, paper and fabrics, or for bonding the elastomer itself to a substrate. In use, the adhesive elastomers of this invention are flowed onto the substrates to be bonded, and cured in-situ whereby the substrates are bonded together, or the elastomer may be bonded to only one substrate.

DETAILED DESCRIPTION OF THE PREFERRED EMBODIMENTS

In a preferred embodiment of this invention, a flowable adhesive elastomeric composition is provided. Epsyn 70A EPDM rubber, an ethylene propylene diene elastomer, is preferred as the basic elastomer (component (a)). This elastomer may be used in amounts between about 30 and about 70 phr, and preferably in the amount of about 60 phr. It is preferred that reinforcing fillers, particularly carbon black, be added to the mixture in an amount between about 30 and about 75 phr. Carbon black helps increase the tensile strength of the cured elastomer. The curing agent is then added, preferably a peroxide such as dicumyl peroxide as DiCup 40 KE, product of Hercules Co. of Wilmington, Del., in an amount sufficient to cure the mixture, e.g., about 15 phr. Other components such as antioxidants, e.g., Agerite Resin D, product of R. T. Vanderbilt Company of Norwalk, Conn.; antiozonates such as methyl niclate, also a product of R. T. Vanderbilt Company; and tackifiers such as Wingtack 95, product of Goodyear Company of Akron, Ohio, may also be added to the mixture as required. As is known in the art, antioxidants and antiozonates are added in small amounts, such as about 1 phr. Tackifiers may be added in amounts between about 5 and about 40 as required for building tack. In addition, cure accelerators known to the art such as TMTD and other materials known to the art may be added.

The lower molecular weight resin is then added. Trilene 65™, a liquid ethylene propylene dicyclopentadiene terpolymer having an average molecular weight of about 7,000 as determined by viscosity analysis (Uniroyal Chemical Company, Middlebury, Conn.), is preferred when EPDM rubber is used as the high molecular weight elastomer because of its structural similarity. This component may be added in amounts between about 30 and about 70 phr, preferably at about 40 phr. Concurrently, or following addition of this component, it is preferred that a crosslink enhancing coagent such as a 1,2 polybutadiene resin, e.g. Ricon 153 or 154, is added in an amount sufficient to lower the percent elongation of the cured product to less than about 180. This amount will generally be around 10 to 15 phr. Finally, or concurrently with the lower molecular weight resin and the coagent, it is preferred that a polymeric adduct of a dicarboxylic acid or anhydride, preferably a maleic acid anhydride of an unsaturated polybutadiene, such as Ricobond 1756, Ricobond 1731 or Ricobond 1031, is added in an amount sufficient to provide adhesive properties to the mixture. This component may be added in amounts between about 5 and about 40 phr, and preferably is added at about 10 phr.

The foregoing components are milled into the mixture containing the high molecular weight elastomer and curing agents. It may be necessary to cool the mixture during mixing to facilitate mixing and removal from the mixing equipment.

The flowable mixture is then applied to a substrate, such as a plastic or metal automobile part, a further substrate whose bonding to the first substrate is desired is then placed in contact with the flowable mixture, and the mixture is cured in situ, resulting in a strong bond between the substrates. Preferably the bond is at least as strong under stress conditions such as tearing and pulling, as the substrates themselves.

The following Examples are provided by way of illustration, not by way of limitation of this invention, which is defined by the scope of the claims hereof.

EXAMPLES

Example 1

Preparation of a Pumpable Adhesive EPDM

Pumpable adhesive EPDM elastomer was mixed on a two roll lab mill. First, carbon black was mixed into Epsyn 70A EPDM rubber followed by DiCup 40KE. DiCup 40KE is a product of Hercules Company of Wilmington, Del., consisting of 40% dicumyl peroxide on clay. This was sheeted to ensure a homogenous mixture, then Trilene 65, Ricon 154 (a crosslink-enhancing coagent), and Ricobond 1756 (a maleinized polymeric adduct) were simultaneously milled into the rubber along with other ingredients known in the art. The formulation was allowed to rest for 24 hours at room temperature and then sampled for testing.

Standard tests for rubber were used including: Vulcanization Characteristics Using Oscillating Disk Cure Meter, ASTM D2084-79; Measurement of Rubber Properties in Tension, ASTM D 412-80; Tear Resistance, ASTM D 624-73, Shore A hardness, and Impact Resilience of Rubber by vertical rebound, ASTM D-2632. Samples were also prepared for lap shear testing on aluminum, steel, and stainless steel. Standard metal strips were used. The aluminum and steel strips were gently sanded and washed with methanol. Stainless steel strips underwent no surface preparation. Test samples were cured under pressure at 160° C. for 30 minutes.

The impact Resilience of Rubber by Vertical Rebound, ASTM D-2632, was performed on a Shore Resliometer. A Shore Durometer was used for hardness testing. Specimen thickness was determined with an Ames 202 thickness gauge. The tensile and tear tests were determined using a GCA/Precision CRE 500 Universal Tester at 508 mm/minute or 50.8 mm/minute as indicated by ASTM. Results are set forth in Table 1.

TABLE 1

| EPDM Pumpable System | | |
|---|---|---|
| EPDM 70A | | 60.0 |
| Trilene 65 | | 40.0 |
| HAF N762 Carbon Black | | 75.0 |
| Dicumyl Peroxide (40%) | | 15.0 |
| Ricon 154 | | 10.0 |
| Ricobond 1756 | | 10.0 |
| | | 210.0 |
| Rheometer Data, ASTM D-2084 | | |
| Model: MP10  Range: 100  Clock: 24 min.  Speed: 100 cps | | |
| Die: Micro  Arc: 1  Temperature: 160° C. | | |
| Initial Viscosity | dNm | 13.6 |
| Minimum Viscosity | dNm | 9.0 |
| Scorch Time (Ts1) | Min. | 1.2 |
| Cure to 90% (T90) | Min. | 13.4 |
| Maximum Torque Mh | dNm | 70.0 |
| Cure Rate Index | | 8.2 |
| Tensile Strength | MPa | 14.5 |
| Ult. Elongation | % | 70.0 |
| Modulus @ 50% | MPa | 10.8 |
| Rebound Resilience | | 39.0 |
| Shore A Hardness | | 86.0 |
| Die C Tear Strength | kN/m | 17.0 |
| Lap Shear Strength ASTM D-816 MPa | | |
| On Aluminum (1) | | 18.2 |
| On Steel (1) | | 15.4 |
| On Stainless Steel (2) | | 13.6 |

(1) Sanded and wiped with methanol
(2) No Preparation

Example 2

Comparison of Tensile Strength of Cured Elastomer Composition with and without Crosslink-enhancing Coagent and Maleinized Polymer Formulas containing a crosslink-enhancing coagent, Ricon 154, and a maleinized polymeric adduct (Ricobond 1756) were compared to formulas without these additives. The formulas were mixed and tested as described in Example 1. Results are set forth in Table 2. These results show dramatic increase in both adhesiveness (lap shear strength) and tensile strength with the additives.

TABLE 2

COMPARISON OF TENSILE STRENGTH OF CURED ELASTOMER COMPOSITION WITH AND WITHOUT CROSSLINK-ENHANCING COAGENT AND MALEINIZED POLYMER

| | WITHOUT | WITH |
|---|---|---|
| Copolymer EPDM 70A | 60.0 | 60.0 |
| Uniroyal Trilene 65 | 40.0 | 40.0 |
| HAF N762 Carbon Black | 75.0 | 75.0 |
| Agerite Resin D (Antioxidant) | 1.0 | 1.0 |
| Methyl Niclate (Antiozonate) | 1.0 | 1.0 |
| Ricon 154 | — | 15.0 |
| Ricobond 1756 | — | 10.0 |
| DiCUP 40KE | 6.0 | 15.0 |
| Wingtack 95 | 25.0 | 25.0 |
| | 208.0 | 242.0 |

Rheometer Data, ASTM D-2084

Model: MP10  Range: 100  Clock: 24 min.  Speed: 100 cps
Die: Micro  Arc: 1  Temperature: 160° C.

| | | | |
|---|---|---|---|
| Min. Torque | DNm | 4.5 | 2.52 |
| Scorch Time | min | 1.97 | 2.13 |
| Cure to 90% | min | 14.9 | 11.43 |
| Max. Torque | DNm | 27.2 | 34.08 |
| Cure Rate Index | | 7.4 | 10.8 |
| Unaged Physicals ASTM D-412, Press Cure @ 160° C., 30 min. | | | |
| Tensile Strength | MPa | 3.71 | 14.51 |
| Ultimate Elongation | % | 45 | 70 |
| Modulus @ 50% | MPa | N/A | 11.0 |
| Rebound Resilience | | 36 | 39 |
| Shore A Hardness | | 85 | 86 |
| Die C Tear | KNm | 7.71 | 16.99 |
| Lap Shear Strength, ASTM D-816 MPa | | | |
| On Aluminum | | 0.02 | 19.13 |

Example 3

Comparison Effect of Crosslink-enhancing Coagents on Physical Properties of EPDM Pumpable Elastomer Without Maleinized Polymers Formulas containing crosslink-enhancing coagents (Ricon 154) and trimethylolpropanetrimethacrylate (TMPTM), the latter at concentrations of 5 and 15 phr, were compared with formulas without these coagents. None of the formulas contained maleinized polymers. The formulas were mixed and tested as described in Example 1. Results are set forth in Table 3.

Useful elastomer compounds were obtained when Ricon 154 was added to EPDM/Trilene compounds. It is unusual to attempt using 15 phr TMPTM in such a system because it has poor compatibility at high concentrations in most elastomers. This appeared to be the case with this system, although a freshly mixed compound could be cured to give a product with quite reasonable physical properties. The main difficulty with this system was that it was very plasticized and tacky, and in general, did not handle well. It should be noted that none of the systems described in Table 3 had lap shear values in bonding to aluminum comparable to those obtained when Ricobond resins (maleinized polybutadiene resins) were added to the systems.

TABLE 3

COMPARISON OF EFFECT OF CROSSLINK-
ENHANCING COAGENTS ON PHYSICAL
PROPERTIES OF EPDM PUMPABLE-ELASTOMER
WITHOUT MALEINIZED POLYMERS

| Formulation | | STD | 154 | TMPTM (5) | TMPTM (15) |
|---|---|---|---|---|---|
| EPDM 70A | | 60.0 | 60.0 | 60.0 | 60.0 |
| Trilene 65 | | 40.0 | 40.0 | 40.0 | 40.0 |
| Carbon Black N762 | | 75.0 | 75.0 | 75.0 | 75.0 |
| AgeRite Resin D | | 1.0 | 1.0 | 1.0 | 1.0 |
| Methyl Niclate | | 1.0 | 1.0 | 1.0 | 1.0 |
| DiCup 40KE | | 15.0 | 15.0 | 15.0 | 15.0 |
| Wingtack 95 | | 25.0 | 25.0 | 25.0 | 25.0 |
| Ricon 154 | | — | 15.0 | — | — |
| TMPTM | | — | — | 5.0 | 15.0 |
| | | 217.0 | 232.0 | 222.0 | 232.0 |

Rheometer Data, ASTM D-2084

Model: MP10  Range: 50  Clock: 24 min.  Speed: 100 cps
Die: Micro  Arc: 1  Temperature: 160° C.

| | | STD | 154 | TMPTM (5) | TMPTM (15) |
|---|---|---|---|---|---|
| Min. Torque | dNm | 5.08 | 4.20 | 4.07 | 3.18 |
| Scorch Time | min. | 1.37 | 1.37 | 1.40 | 1.44 |
| Cure to 90% | min. | 14.93 | 14.93 | 12.93 | 16.22 |
| Max. Torque | dNm | 30.71 | 46.57 | 32.74 | 31.20 |
| Cure Rate Index | | 6.04 | 6.04 | 8.67 | 6.77 |

Unaged Physicals
ASTM D-412, Press Cure
@ 160° C., min.

| | | STD | 154 | TMPTM (5) | TMPTM (15) |
|---|---|---|---|---|---|
| Ten. Strength | MPa | 14.7 | 12.4 | 15.7 | 13.4 |
| Ultimate Elongation | % | 375 | 152 | 293 | 293 |
| Modulus @ 50% | MPa | 0.8 | 2.2 | 1.0 | 1.0 |
| 100% | " | 1.6 | 6.4 | 1.3 | 2.0 |
| 150% | " | 3.2 | 12.0 | 4.1 | 4.0 |
| 200% | " | 5.0 | — | 7.2 | 7.3 |
| 250% | " | 7.5 | — | 12.1 | 10.8 |
| 300% | " | 10.2 | — | — | — |
| Rebound Resilience | | 35 | 27 | 34 | 32 |
| Shore A Hardness | | 60 | 74 | 63 | 68 |
| Die C Tear KN/m | | 42.4 | 28.3 | 39.2 | 37.3 |
| Lap Shear Strength, ASTM D-816 MPa | | | | | |
| On Aluminum (1) | | 1.9 | 4.3 | 2.8 | 5.8 |

(1) Sanded and methanol washed

Example 4

Comparison of Formulas With and Without Maleinized Polymers, and Crosslink-enhancing Coagents Formulas containing and not containing maleinized polymers (Ricobond) were compared in the presence and absence of crosslink-enhancing coagents (Ricon 154 and TMPTM). A high shear internal mixer (Banbury) was used to mix a masterbatch containing EPDM 70A, Trilene 65, Carbon Black N762, Agerite Resin D, Methyl Niclate, Dicup 40KE, and Wingtack 95. The various compounds described in Table 4 including the standard were then mixed on a two roll mill. Most of the compounds were so plasticized that they had to be cooled during mixing in order to achieve good results and during removal from the mill. Some of the compounds would probably have been easier to mix in a sigma blade mixer or an extruder, or both. However, for laboratory compounding, the cooled roll mill was satisfactory. Results are shown in Table 4. These results show that maleinized polybutadiene alone produced adhesion on aluminum significantly greater than that observed when only Trilene or when Trilene and a coagent were used. However, it is evident from the data that the combination of Trilene, coagent and maleinized polybutadiene gives the best adhesive compound. It is also evident that this particular combination also results in very highly crosslinked rubber as can be seen from the values for elongation which are significantly lower than the values for the compositions lacking the crosslinking enhancing coagents. The adhesive strength in lap shear is related to the strength of the rubber, since the usual failure of the bond to aluminum in this system is tearing of the rubber, not failure at the interface of rubber to aluminum. It should be noted that this is only part of the picture, since compound B resulting from coagent Ricon 154 is highly crosslinked, but does not have high lap shear strength.

TABLE 4

EFFECTS OF RICON AND RICOBOND
ON TRILENE MODIFIED EPDM FORMULAS

| Formulation | STD | A | B | C | D | E | F | G | H |
|---|---|---|---|---|---|---|---|---|---|
| EPDM 70 A | 60.0 | 60.0 | 60.0 | 60.0 | 60.0 | 60.0 | 60.0 | 60.0 | 60.0 |
| Trilene 65 | 40.0 | 40.0 | 40.0 | 40.0 | 40.0 | 40.0 | 40.0 | 40.0 | 40.0 |
| Carbon Black N762 | 75.0 | 75.0 | 75.0 | 75.0 | 75.0 | 75.0 | 75.0 | 75.0 | 75.0 |
| AgeRite Resin D | 1.0 | 1.0 | 1.0 | 1.0 | 1.0 | 1.0 | 1.0 | 1.0 | 1.0 |
| Methyl Niclate | 1.0 | 1.0 | 1.0 | 1.0 | 1.0 | 1.0 | 1.0 | 1.0 | 1.0 |
| DiCup 40KE | 15.0 | 15.0 | 15.0 | 15.0 | 15.0 | 15.0 | 15.0 | 15.0 | 15.0 |
| Wingtack 95 | 25.0 | 25.0 | 25.0 | 25.0 | 25.0 | 25.0 | 25.0 | 25.0 | 25.0 |
| Ricobond 1031 | — | — | — | 10.0 | 10.0 | — | — | — | — |
| Ricobond 1731 | — | — | — | — | — | 10.0 | 10.0 | — | — |
| Ricobond 1756 | — | — | — | — | — | — | — | 10.0 | 10.0 |
| Ricon 154 | — | 15.0 | — | — | 15.0 | — | 15.0 | — | 15.0 |
| TMPTM | — | — | 5.0 | — | — | — | — | — | — |
| | 217.0 | 232.0 | 222.0 | 227.0 | 242.0 | 227.0 | 242.0 | 227.0 | 242.0 |

Rheometer Data, ASTM D-2084

Model: MP10  Range: 50  Clock: 24 min.  Speed: 100 cps
Die: Micro  Arc: 1  Temperature: 160° C.

| | | STD | A | B | C | D | E | F | G | H |
|---|---|---|---|---|---|---|---|---|---|---|
| Min. Torque | dNm | 5.08 | 4.20 | 4.07 | 4.68 | 3.39 | 4.27 | 3.53 | 4.88 | 2.85 |

TABLE 4-continued

EFFECTS OF RICON AND RICOBOND ON TRILENE MODIFIED EPDM FORMULAS

| Formulation | | STD | A | B | C | D | E | F | G | H |
|---|---|---|---|---|---|---|---|---|---|---|
| Scorch Time | min. | 1.37 | 1.37 | 1.40 | 1.60 | 1.53 | 1.93 | 1.30 | 1.47 | 2.13 |
| Cure to 90% | min. | 14.93 | 14.93 | 12.93 | 14.87 | 10.00 | 14.03 | 9.70 | 14.60 | 11.43 |
| Max. Torque | dNm | 30.71 | 46.57 | 32.74 | 29.01 | 37.69 | 25.76 | 36.13 | 28.95 | 38.51 |
| Cure Rate Index | | 6.04 | 6.04 | 8.67 | 7.54 | 11.81 | 8.26 | 11.91 | 7.62 | 10.75 |
| Mooney Viscosity (250 F.) | | 25.40 | — | — | — | 16.50 | — | 17.03 | — | 16.38 |
| Unaged Physicals ASTM D-412, Press Cure @ 160° C., min. | | | | | | | | | | |
| Ten. Strength | MPa | 14.7 | 12.4 | 15.7 | 13.6 | 10.9 | 12.6 | 12.6 | 12.2 | 12.6 |
| Ult. Elongation | % | 375 | 152 | 293 | 413 | 165 | 453 | 165 | 363 | 163 |
| Modulus @ 50% | MPa | 0.8 | 2.2 | 1.0 | 1.1 | 1.9 | 1.1 | 2.8 | 1.3 | 3.0 |
| 100% | " | 1.6 | 6.4 | 1.3 | 2.0 | 4.9 | 1.7 | 5.8 | 1.9 | 6.2 |
| 150% | " | 3.2 | 12.0 | 4.1 | 3.2 | 9.7 | 2.5 | 11.0 | 3.2 | 11.0 |
| 200% | " | 5.0 | — | 7.2 | 4.9 | — | 3.6 | — | 4.8 | — |
| 250% | " | 7.5 | — | 12.1 | 6.5 | — | 5.3 | — | 6.4 | — |
| 300% | " | 10.2 | — | — | 9.2 | — | 6.6 | — | 9.4 | — |
| Rebound Resilience | | 35 | 27 | 34 | 33 | 27 | 30 | 26 | 28 | 26 |
| Shore A Hardness | | 60 | 74 | 63 | 63 | 75 | 63 | 78 | 70 | 82 |
| Die C Tear | KN/m | 42.4 | 28.3 | 39.2 | 29.4 | 30.2 | 43.5 | 29.6 | 40.3 | 34.4 |
| Lap Shear Strength, ASTM D-816 MPa | | | | | | | | | | |
| On Aluminum (1) | | 1.9 | 4.3 | 2.8 | 8.0 | 10.9 | 7.1 | 13.3 | 11.5 | 13.7 |

(1) Sanded and methanol washed

We claim:

1. An uncured adhesive elastomeric composition having a Mooney viscosity at most about 20 at a temperature of 125° C., comprising:
   (a) a synthetic elastomer having a Raw Mooney Viscosity ML1+4 at 125° C. of about 20 to about 85 in an amount between about 30 and about 70 phr;
   (b) a synthetic resin which is not the said synthetic elastomer of paragraph (a) curable by the same cure system as component (a) above having a molecular weight between about 5,200 and about 70,000 in an amount sufficient to lower the Mooney viscosity of the mixture to at most about 20 at a temperature of 125° C., which amount is 100 phr minus the amount of component (a);
   (c) an unsaturated polymeric adduct of a dicarboxylic acid or dicarboxylic acid derivative, wherein the acid or derivative moiety comprises at least about three weight percent of said adduct, said adduct present in an amount sufficient to provide adhesive properties to the mixture; and
   (d) a curing agent capable of curing said composition.

2. The composition of claim 1 also comprising:
   (e) a crosslink-enhancing coagent which is not the synthetic elastomer of paragraph (a) or the synthetic resin of paragraph (b) in an amount sufficient to lower percent elongation and increase adhesive bond strength of the cured elastomer.

3. The composition of claim 1 wherein component (b) has an analogous or identical structure to component (a) with a shorter chain length.

4. The composition of claim 1 wherein component (c) comprises a polybutadiene adduct of maleic acid anhydride.

5. The composition of claim 1 wherein component (d) comprises a peroxide curing agent.

6. The composition of claim 2 wherein component (b) has an analogous or identical structure to component (a) with a shorter chain length.

7. The composition of claim 2 wherein component (c) comprises a polybutadiene adduct of maleic acid anhydride.

8. The composition of claim 2 wherein component (d) comprises a peroxide curing agent.

9. The composition of claim 2 wherein component (e) comprises a polybutadiene polymer having at least fifty percent by weight 1,2 vinyl content.

10. The composition of claim 2 wherein component (e) is selected from the group consisting of 1,2 polybutadiene resins, di, tri and tetra functional acrylates and methacrylates, triallycyanurate, triallylisocyanurate, triallyltrimellitate, and N,N-meta-phenylenediamaleimide.

11. The composition of claim 2 having a cured tensile strength greater than about 8 MPa and a percent elongation less than about 200.

12. An uncured adhesive elastomeric composition having a Mooney viscosity at most about 20 at a temperature of 125° C., comprising:
   (a) ethylene propylenediene elastomer in an amount between about 30 and about 70 phr;
   (b) liquid ethylene propylene dicyclopentadiene terpolymer in an amount sufficient to lower the Mooney viscosity of the mixture to at most about 20 at a temperature of 125° C., and in an amount equal to 100 phr minus the amount of component (a);
   (c) a polybutadiene adduct of maleic acid anhydride in an amount sufficient to provide adhesive properties to the mixture;
   (d) dicumyl peroxide in an amount sufficient to cure said mixture; and
   (e) a 1,2 polybutadiene resin having at least about 50% by weight 1,2 vinyl content.

13. An uncured adhesive elastomeric composition having a Mooney viscosity at most about 20 at a temperature of 125° C. comprising:
   (a) an elastomer having a Raw Mooney Viscosity ML1+4 at 125° C. of about 20 to about 85 in an amount between about 30 and about 70 phr;

(b) a synthetic resin which is not the elastomer of paragraph (a) curable by the same cure system as component (a) above having a molecular weight between about 5,200 and about 70,000 in an amount sufficient to lower the Mooney viscosity of the mixture to at most about 20 at a temperature of 125° C., which amount is 100 phr minus the amount of component (a);

(c) an unsaturated polymeric adduct of a dicarboxylic acid or dicarboxylic acid derivative, wherein the acid or derivative moiety comprises at least about three weight percent of said adduct, said adduct present in an amount sufficient to provide adhesive properties to the mixture;

(d) a curing agent capable of curing said composition; and (e) a crosslink-enhancing coagent which is not the elastomer of paragraph (a) or the synthetic resin of paragraph (b) in an amount sufficient to lower percent elongation and increase adhesive bond strength of the cured elastomer.

14. An uncured adhesive elastomeric composition having a Mooney viscosity at most about 20 at a temperature of 125° C., comprising:

(a) an elastomer comprising an uncured natural rubber having a Raw Mooney Viscosity ML1+4 at 125° C. of about 20 to about 85 in an amount between about 30 and about 70 phr;

(b) a synthetic resin curable by the same cure system as component (a) above having a molecular weight between about 5,200 and about 70,000 in an amount sufficient to lower the Mooney viscosity of the mixture to at most about 20 at a temperature of 125° C., which amount is 100 phr minus the amount of component (a);

(c) an unsaturated polybutadiene polymeric adduct of a dicarboxylic acid or dicarboxylic acid derivative, wherein the acid or derivative moiety comprises at least about three weight percent of said adduct, wherein the unsaturated polymeric moiety of said adduct has less than about 70% by weight cis-1,4 content, and wherein said adduct is present in an amount sufficient to provide adhesive properties to the mixture; and (d) a curing agent capable of curing said composition.

15. The composition of claim 14 also comprising:

(e) a crosslink-enhancing coagent which is not the synthetic resin of paragraph (b) in an amount sufficient to lower percent elongation and increase adhesive bond strength of the cured elastomer.

16. A method for making a flowable adhesive elastomeric composition comprising:

(a) mixing into a composition comprising a synthetic elastomer having a Raw Mooney Viscosity ML1+4 at 125° C. of about 20 to about 85 and a curing agent, an amount of a synthetic resin which is not said synthetic elastomer curable by the same curing agent as said synthetic elastomer sufficient to lower the Mooney viscosity of the mixture to at most about 20 at a temperature of 125° C., said resin having a molecular weight between about 5,200 and about 70,000;

(b) further mixing into said composition an unsaturated polymeric adduct of a dicarboxylic acid or dicarboxylic acid derivative, wherein the acid or derivative moiety comprises at least about three weight percent of said adduct, in an amount sufficient to provide adhesive properties to the mixture.

17. A method for making a flowable adhesive elastomeric composition comprising:

(a) mixing into a composition comprising an uncured natural rubber having a Raw Mooney Viscosity ML1+4 at 125° C. of about 20 to about 85 and a curing agent, an amount of a synthetic resin curable by the same curing agent as said natural rubber sufficient to lower the Mooney viscosity of the mixture to at most about 20 at a temperature of 125° C., said resin having a molecular weight between about 5,200 and about 70,000;

(b) further mixing into said composition an unsaturated polybutadiene polymeric adduct of a dicarboxylic acid or dicarboxylic acid derivative, wherein the acid or derivative moiety comprises at least about three weight percent of said adduct, and wherein the unsaturated polymeric moiety of said adduct has less than about 70% by weight cis-1,4 content, in an amount sufficient to provide adhesive properties to the mixture.

18. The method of claim 17 further comprising mixing into said composition prior to or concurrently with said adduct, a crosslink-enhancing coagent which is not said synthetic resin in an amount sufficient to enhance the adhesiveness of said composition and lower the percent elongation of the cured elastomer to at most about 200.

19. A method for making a flowable adhesive elastomeric composition comprising:

(a) mixing into a composition comprising an elastomer having a Raw Mooney Viscosity ML1+4 at 125° C. of about 20 to about 85 and a curing agent, an amount of a synthetic resin which is not said elastomer curable by the same curing agent as said elastomer sufficient to lower the Mooney viscosity of the mixture to at most about 20 at a temperature of 125° C., said resin having a molecular weight between about 5,200 and about 70,000;

(b) further mixing into said composition an unsaturated polymeric adduct of a dicarboxylic acid or dicarboxylic acid derivative, wherein the acid or derivative moiety comprises at least about three weight percent of said adduct, in an amount sufficient to provide adhesive properties to the mixture; and (c) further mixing into said composition prior to or concurrently with said adduct, a crosslink-enhancing coagent which is not said elastomer or said synthetic resin in an amount sufficient to enhance the adhesiveness of said composition and lower the percent elongation of the cured elastomer to at most about 200.

20. A method of bonding an elastomeric composition to a substrate comprising contacting said substrate with the composition of claim 1 and curing said composition in contact with said substrate.

21. The composition of claim 1 wherein said synthetic resin of paragraph (b) is a liquid ethylene propylene dicyclopentadiene terpolymer.

22. The composition of claim 1 wherein said synthetic resin of paragraph (b) is a liquid ethylene propylene dicyclopentadiene terpolymer having a molecular weight of about 7,000.

23. The composition of claim 13 wherein said synthetic resin of paragraph (b) is a liquid ethylene propylene dicyclopentadiene terpolymer.

24. The composition of claim 13 wherein said synthetic resin of paragraph (b) is a liquid ethylene propylene dicyclopentadiene terpolymer having a molecular weight of about 7,000.

25. The composition of claim 14 wherein said synthetic resin of paragraph (b) is a liquid ethylene propylene dicyclopentadiene terpolymer.

26. The composition of claim 14 wherein said synthetic resin of paragraph (b) is a liquid ethylene propylene dicyclopentadiene terpolymer having a molecular weight of about 7,000.

27. The method of claim 16 wherein said synthetic resin of paragraph (b) is a liquid ethylene propylene dicyclopentadiene terpolymer.

28. The method of claim 16 wherein said synthetic resin of paragraph (a) is a liquid ethylene propylene dicyclopentadiene terpolymer having a molecular weight of about 7,000.

29. The method of claim 19 wherein said synthetic resin of paragraph (a) is a liquid ethylene propylene dicyclopentadiene terpolymer.

30. The method of claim 19 wherein said synthetic resin of paragraph (a) is a liquid ethylene propylene dicyclopentadiene terpolymer having a molecular weight of about 7,000.

31. The cured composition of claim 1.

32. The cured composition of claim 13.

33. The cured composition of claim 14.

34. The method of claim 16 further comprising mixing into said composition prior to or concurrently with said adduct a crosslink-enhancing coagent which is not said synthetic elastomer or said synthetic resin in an amount sufficient to enhance the adhesiveness of said composition and lower the percent elongation of the cured elastomer to at most about 200.

35. An uncured adhesive elastomeric composition having a Mooney viscosity at most about 20 at a temperature of 125° C. comprising:
 (a) a synthetic elastomer having a Raw Mooney Viscosity ML1+4 at 125° C. of about 20 to about 85 in an amount between about 30 and about 70 phr;
 (b) a synthetic resin, which resin is curable by the same cure system as component (a) above, having a molecular weight less than the molecular weight of said synthetic elastomer of paragraph (a), in an amount sufficient to lower the Mooney viscosity of the mixture to at most about 20 at a temperature of 125° C., which amount is 100 phr minus the amount of component (a);
 (c) an unsaturated polymeric adduct of a dicarboxylic acid or dicarboxylic acid derivative, wherein the acid or derivative moiety comprises at least about three weight percent of said adduct, said adduct present in an amount sufficient to provide adhesive properties to the mixture; and
 (d) a curing agent capable of curing said composition.

36. An uncured adhesive elastomeric composition having a Mooney viscosity at most about 20 at a temperature of 125° C., comprising:
 (a) an elastomer having a Raw Mooney Viscosity ML1+4 at 125° C. of about 20 to about 85 in an amount between about 30 and about 70 phr;
 (b) a synthetic resin curable by the same cure system as component (a) above, having a molecular weight less than the molecular weight of said synthetic elastomer of paragraph (a), in an amount sufficient to lower the Mooney viscosity of the mixture to at most about 20 at a temperature of 125° C., which amount is 100 phr minus the amount of component (a);
 (c) an unsaturated polymeric adduct of a dicarboxylic acid or dicarboxylic acid derivative, wherein the acid or derivative moiety comprises at least about three weight percent of said adduct, said adduct present in an amount sufficient to provide adhesive properties to the mixture;
 (d) a curing agent capable of curing said composition; and
 (e) a crosslink-enhancing coagent which is not the elastomer of paragraph (a) or the synthetic resin of paragraph (b) in an amount sufficient to lower percent elongation and increase adhesive bond strength of the cured elastomer.

37. An uncured adhesive elastomeric composition having a Mooney viscosity at most about 20 at a temperature of 125° C., comprising:
 (a) an elastomer comprising an uncured natural rubber having a Raw Mooney Viscosity ML1+4 at 125° C. of about 20 to about 85 in an amount between about 30 and about 70 phr;
 (b) a synthetic resin curable by the same cure system as component (a) above, having a molecular weight less than the molecular weight of said synthetic elastomer of paragraph (a) in an amount sufficient to lower the Mooney viscosity of the mixture to at most about 20 at a temperature of 125° C., which amount is 100 phr minus the amount of component (a);
 (c) an unsaturated polybutadiene polymeric adduct of a dicarboxylic acid or dicarboxylic acid derivative, wherein the acid or derivative moiety comprises at least about three weight percent of said adduct, wherein the unsaturated polymeric moiety of said adduct has less than about 70% by weight cis-1,4 content and wherein said adduct is present in an amount sufficient to provide adhesive properties to the mixture; and
 (d) a curing agent capable of curing said composition.

38. A method for making a flowable adhesive elastomeric composition comprising:
 (a) mixing into a composition comprising a synthetic elastomer having a Raw Mooney Viscosity ML1+4 at 125° C. of about 20 to about 85 and a curing agent, an amount of a synthetic resin which is not said synthetic elastomer curable by the same curing agent as said synthetic elastomer sufficient to lower the Mooney viscosity of the mixture to at most about 20 at a temperature of 125° C., said resin having a molecular weight less than a molecular weight of said synthetic elastomer of paragraph (a);
 (b) further mixing into said composition an unsaturated polymeric adduct of a dicarboxylic acid or dicarboxylic acid derivative, wherein the acid or derivative moiety comprises at least about three weight percent of said adduct, in an amount sufficient to provide adhesive properties to the mixture.

39. A method of bonding an elastomeric composition to a substrate comprising contacting said substrate with the composition of claim 14 and curing said composition in contact with said substrate.

* * * * *